United States Patent [19]

Hallerback et al.

[11] 4,162,039

[45] Jul. 24, 1979

[54] FEEDING AND MIXING NOZZLE

[75] Inventors: Stig L. Hallerback, Vastra Frolumda; Leif Lachonius, Surte both of Sweden

[73] Assignee: Aktiebolaget SKF, Gothenborg, Sweden

[21] Appl. No.: 798,647

[22] Filed: May 19, 1977

[30] Foreign Application Priority Data

Jul. 5, 1976 [SE] Sweden .............................. 7607647

[51] Int. Cl.² .............................................. B05B 3/02
[52] U.S. Cl. .......................... 239/214.25; 239/222.11; 425/434
[58] Field of Search ............... 425/130, 200, 425, 434, 425/449; 264/311; 141/34; 239/222.11, 224, 214.25

[56] References Cited

U.S. PATENT DOCUMENTS

| | | | |
|---|---|---|---|
| 2,005,987 | 6/1935 | Bowen | 239/222.11 |
| 2,087,627 | 7/1937 | Nyrop | 239/222.11 |
| 2,618,031 | 11/1952 | Mazer | 264/311 |
| 2,902,223 | 9/1959 | Nyrop | 239/222.11 |
| 3,481,546 | 12/1969 | Nielsen | 239/224 |
| 3,619,865 | 11/1971 | Hazzard | 264/311 |
| 3,683,973 | 8/1972 | Hatcher, Sr. | 141/34 |

*Primary Examiner*—John McQuade
*Attorney, Agent, or Firm*—Eugene E. Renz, Jr.

[57] ABSTRACT

A nozzle for dosing, feeding and if necessary mixing liquid and/or solid components, comprising a rotatable vessel of cup-like form. The vessel has a base, a central hub portion and an outer generally cylindrical wall spaced radially outwardly from the hub portion. The cylindrical wall has a pouring opening in its upper portion and a plurality of outlet openings disposed preferably at its lower portion. The vessel is rotatable about a central vertically disposed axis through the hub portion. The vessel is divided into a plurality of chambers by vertically oriented equiangularly spaced partition walls extending between the hub and outer wall.

2 Claims, 8 Drawing Figures

FEEDING AND MIXING NOZZLE

BACKGROUND OF THE INVENTION

The present invention refers to a feeding and mixing nozzle, which is primarily intended for mixing liquid resin mixtures and feeding them into molds by means of centrifugal force.

When molding for instance cureable resin mixtures there are particularly two different factors or problems to consider, viz. a correct dosing of the volume of molding mixture and the desideratum to be able to complete the mixtue as shortly prior to the feeding as possible in order to avoid curing and plugging up the nozzle and the feed channels. An example of a solution for solving the above problem has been given in Swedish patent No. 370,351. In this patent is shown a mixing vessel with a bottom-opening and a sophisticated rotating mixing device inside the vessel. This device is complicated and lacks means for dosing and distributing the resin mixture.

The purpose of the present invention is to solve the abovementioned problems and to provide a device, which doses as well as mixes the molding mixture thus that well measured volumes of molding mixture is fed, after being well stirred, into several molds simultaneously. The mixing is accomplished at the latest possible stage and plugging up of the apparatus is therefore avoided.

SUMMARY OF THE INVENTION

According to the present invention there has thus been provided a nozzle for dosing, feeding and if necessary mixing liquid and/or solid components, which nozzle is characterized thereby that it includes a rotatable vessel provided with a pouring opening in its upper portion and outlet openings arranged preferably in its lower portion, the vessel being subdivided into a number of chambers each one having its own outlet opening.

It is preferable that the vessel is divided into chambers by means of vertical partition walls.

The partition walls are preferably arranged radially and spaced apart at a constant angular distance.

In a preferred embodiment of the invention the lower part of the vessel tapers against the bottom and the outlet openings are arranged at the upper portion of the taper.

Intermediate walls intended to split up the pouring jet are arranged in order to bring about a good mixing of the components.

It is essential that these intermediate walls all are of the same height.

The rotatable vessel is preferably open at its top side, whereby the pouring opening is formed by the upper, horizontal surface of the vessel.

The components which shall be introduced into the vessel may then flow through supply tubes directly down into the vessel. It is preferable if these supply tubes are arranged side by side.

In order to obtain thorough stirring and mixing of the components, auxiliary means may be provided in addition to the intermediate walls. Such further means can be nets, labyrinth walls or other corresponding arrangements arranged in each chamber. The molds intended for receiving the components can be arranged on a rotating disc. According to an embodiment of the invention the nozzle is attached to this disc and rotates all the time together with the disc.

According to another embodiment of the invention the nozzle may be arranged separately from the device which shall receive the components and it may be supported such that it is rotated by means of the rotatable device, when this is brought to engagement with the nozzle.

If three or more components shall be mixed and it is unsuitable that they are all mixed at the same time it is possible according to the invention to connect two nozzles in series by arranging them concentric into each other and thereupon feed the two nozzle portions with different liquids.

DESCRIPTION OF THE DRAWINGS

The invention will hereinafter be further described with reference to the drawings which show some embodiments of the nozzles according to the invention.

DESCRIPTION OF PREFERRED EMBODIMENTS

Figure 1:
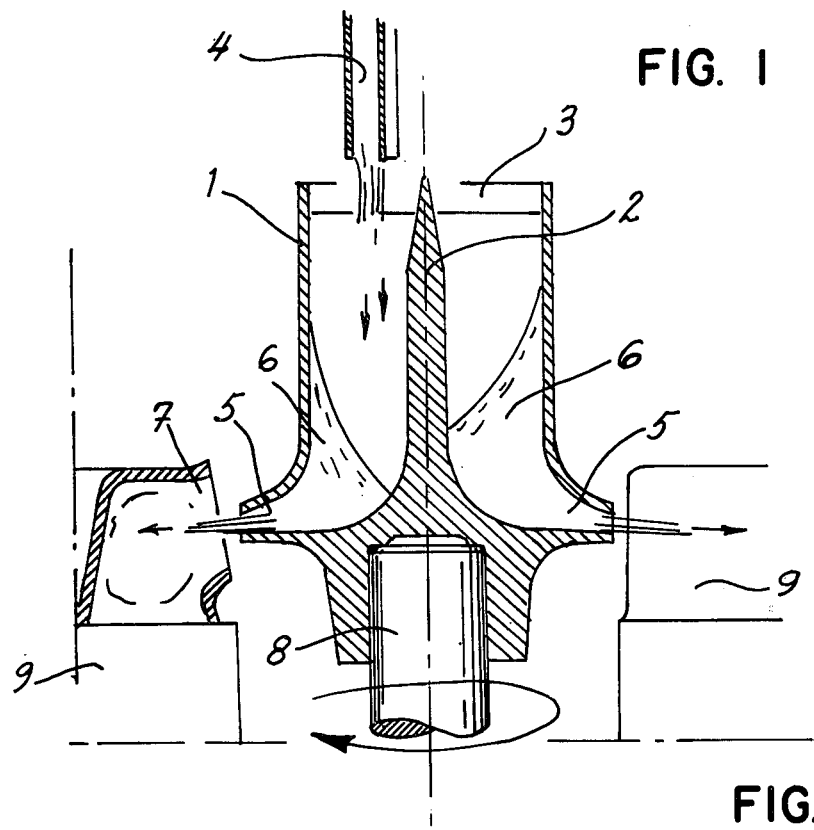
FIG. 1 shows in a vertical section a nozzle according to the invention.

FIG. 1 shows the mixing and feeding nozzle 1 which is formed as a cylindrical vessel having a central axis 2. The pouring opening 3 of the nozzle is formed by the upper open end portion thereof. The supply tube 4 is arranged eccentrically relative to the central axis 2. The figure shows two tubes but the nozzle can of course have more than two such tubes arranged therein. The nozzle is provided with outlet openings 5 for the mixed molding mixture 6. It can be clearly viewed from the figure that the mixture 6 is allowed to flow freely into the opening 7 of the receiving mold, which in the present case is a stator for an electric machine. The nozzle is arranged on a trunnion 8 and rotates together with the molds 9, whereby the molding mixture 6 due to centrifugal force is thrown into these molds.

Figure 2:
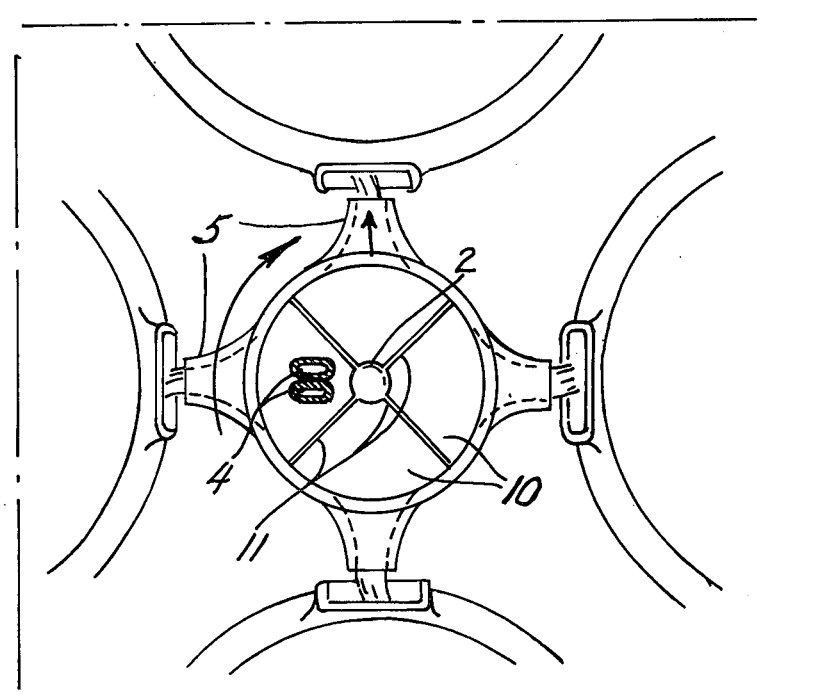
FIG. 2 shows the same nozzle as seen from above.

FIG. 2 which shows from above a device according to FIG. 1 will give a picture of how the nozzle 1 is divided into chambers 10, formed by means of vertical partition walls 11. The tubes 4 are arranged eccentrically to the axis 2. When liquid is allowed to flow down through the immobile tubes 4 all chambers due to the rotation of the nozzle will be fed with an equal volume of the liquid as the different walls are arranged at the same mutual angular distance. If now a certain volume of liquid has been metered and shall be filled into the four stators as shown in the figure, the nozzle will give the four stators exactly equal volumes of liquid independent of the size of the chambers, the tube and the outlet openings 5. These openings have a tendency of becoming plugged up due to the fact that the resin is curing and it is thus difficult to maintain the openings of constant size and a constant flow rate in all four openings. The only difference which will occur in the flow in the four stators is that the time for each chamber to empty itself will be different if the outlet openings are not exactly alike.

The liquids in the two tubes 4 shown can for instance be an epoxy resin in one of the tubes and a hardener in the other one. When a partition wall passes the jets of liquid will these impinge against the partition wall and become stirred. During the further movement of the liquid against the outlet opening a further stirring will take place and this mixing can be improved by means of different auxiliary means such as nets, walls and the like which will impose turbulence to the liquid flow. The mixing of the liquids will be best if the tubes 4 are arranged side by side and if the flows of liquid from the two tubes are impinging against the partition walls at the same time. It is however evident that the tubes also can be arranged separately and that it is possible principally to have as many supply tubes as wanted. If the liquids are hard to mix it can be advantageous to allow them to flow down into the chambers through a larger number of tubes.

In FIG. 2 there is shown four chambers, which all will give an equal volume of mixed liquid to the molds. The volumes will be equal due to the fact that the angular distance between the partition walls is equal but it is evident that the liquid flow in some cases can be divided into flows of different size by changing the angular distance between the walls.

Figure 3:
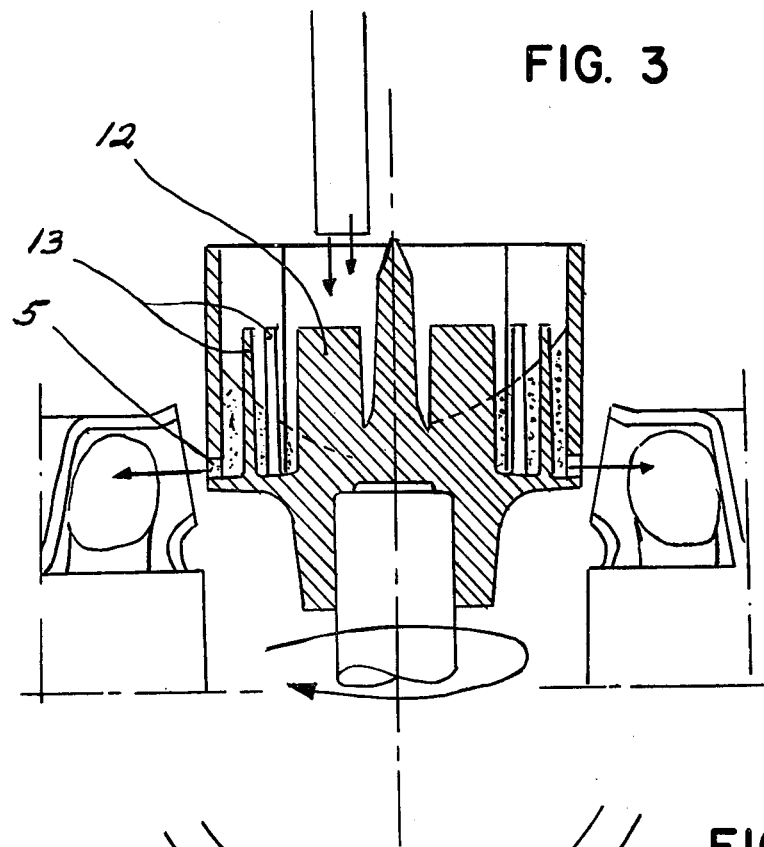
FIG. 3 shows a second embodiment of a nozzle according to FIG. 1.
Figure 4:
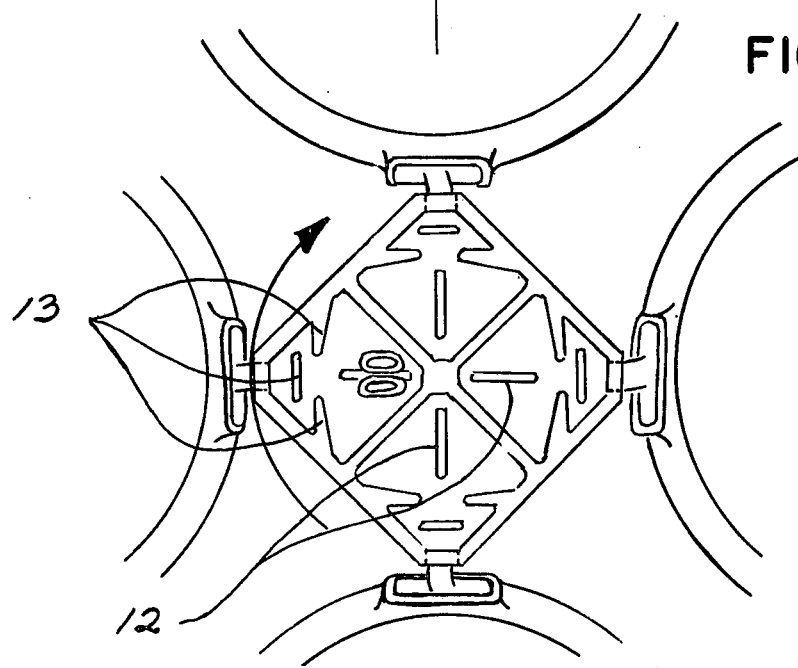
FIG. 4 shows the nozzle according to FIG. 3 as seen from above.

FIGS. 3 and 4 show another embodiment of the nozzle according to the invention. The vessel is in this embodiment square and it has been provided with intermediate walls 12 and labyrinth walls 13. The outlet openings 5 have been formed by holes drilled in the walls of the vessel 1. With this arrangement, a more effective disintegration of the liquids fed to the nozzle is obtained and the mixed liquid traverses a longer path to the outlet openings 5 by reason of the labyrinthian walls 13.

Figure 5:
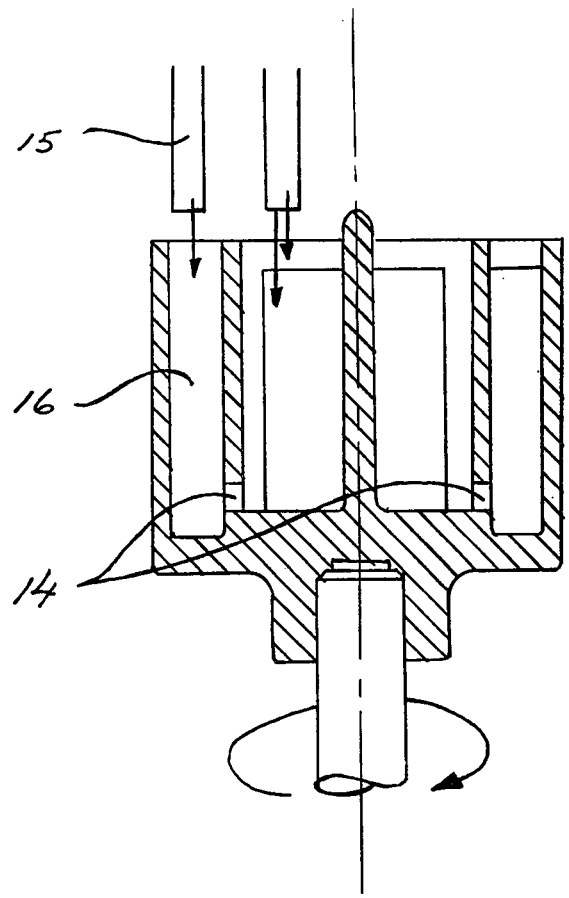
FIG. 5 is a vertical section through a nozzle in which three or more liquid flows shall be mixed but not at the same time.
Figure 6:
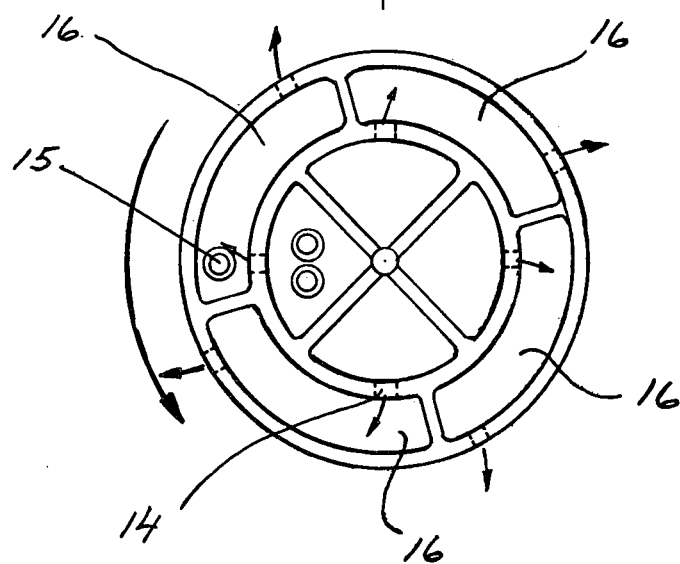
FIG. 6 shows the nozzle according to FIG. 5 as seen from above.

FIGS. 5 and 6 shows a feeding and mixing device for three liquids which shall not be mixed simultaneously. Two mixing vessels have here been arranged concentric one inside the other and there is outlet openings 14 from the inner vessel to the outer vessel. Above this outer vessel opens a third tube 15 and liquid from this tube will be mixed in the chambers 16 with the premixed liquid from the inner chambers.

Liquids which it is preferable to mix in this manner can for instance be a plastic material, a hardener and an accelerator for the hardener. In such a case is it essential that the accelerator will not come in contact with the hardener too early as otherwise an explosion-like reaction can occur.

Figure 7:
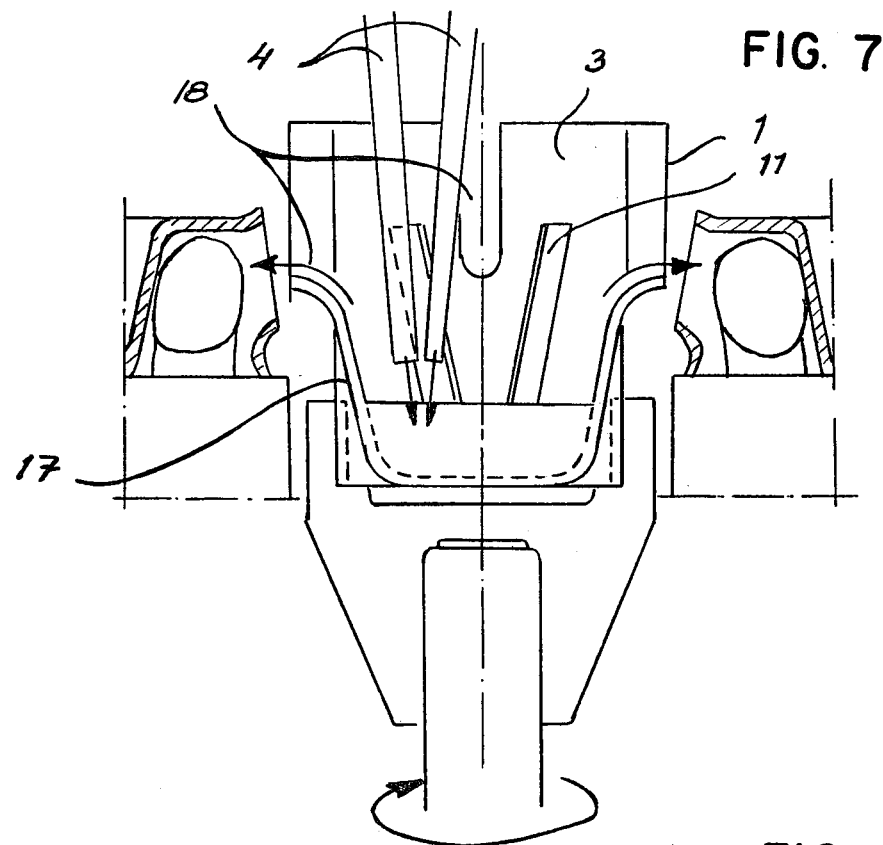
FIG. 7 shows in a vertical section a further embodiment of the nozzle according to the invention.
Figure 8:
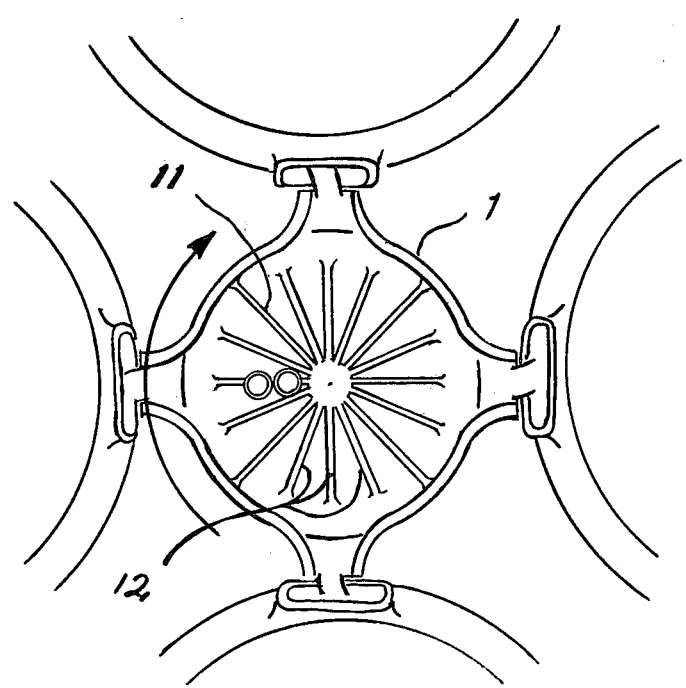
FIG. 8 shows the nozzle according to FIG. 7 as seen from above.

A further, and preferred embodiment of the invention is shown in FIGS. 7 and 8. The essential difference between this embodiment and the embodiments earlier shown is that the lower portion 17 of the vessel has been made tapering against the bottom. During rotation the molding mixture will thereby be forced upwards along the wall and it is allowed to escape from the vessel through the outlet openings 18, which in this case are made as slots which are open at their upper end.

A large number of intermediate walls 12 have been arranged for disintegrating the pouring jet. It is essential for a good mixing of the components that all of these walls are equally high.

The partition walls 11 which are spaced apart at equal distances divide the volume of liquid in equally large portions. These walls therefore must reach somewhat higher than the bottom of the slots 18.

An advantage at this nozzle is that it can be made by injection molding in a two piece mold at a very low manufacturing cost.

The members, for example stators for electric motors, which shall receive the portioned volume of molding mixture are preferably attached to a rotatable disc provided with a pouring opening facing the center of the disc. The mixing and feeding nozzle in such a case can be firmly connected to the disc and located in its center. As the chambers must be emptied in a very short period of time before the mixture has begun to gel appreciably is it not necessary to clean the nozzle.

It is however possible that the nozzle is instead supported separately from the rotating disc and above this. By raising the disc to let it engage the nozzle is this brought to rotate. An advantage of this embodiment is that the same nozzle can be used for serving several sets of stators on different discs. It is necessary that the disc must rotate during a period of time after that pouring is completed until the plastic mixture has been sufficiently cured. It is thereby possible to use only one nozzle for pouring a plurality of disc sets.

As can be seen from the figures of the drawings is the mixed resin mixture allowed to flow directly into the mold without being transferred via tubes or the like. Hereby all problems regarding plugging up of the supply tubes are avoided as well as the job of removing the pouring ingate.

The feeding nozzle according to the invention can be manufactured from a plastic material or from another cheap material and can be made at a very low price. If it should prove itself desirable to cleam the nozzle after some time of use it is instead possible to remove the entire nozzle and replace it for another whereupon the old nozzle can be thrown away. Different problems at cleaning is thereby avoided i.a. environmental problems, which are significant and expensive.

The invention is not limited to the embodiments shown but can be modified in several ways within the scope of the appended claims.

We claim:

1. A nozzle for dosing, feeding and if necessary mixing liquid and/or solid components, comprising a rotatable vessel having a pouring opening in its upper portion and a plurality of outlet openings disposed at its lower portion, said vessel rotatable about a central vertically disposed axis and comprising inner and outer sections concentrically arranged and connected in series, said inner section divided into a plurality of inner chambers by vertically oriented equiangularly spaced partition walls, said outer section divided into a plurality of outer chambers, each of said inner chambers having a flow port communicating with said outer chambers in the outer section.

2. A nozzle for dosing, feeding and if necessary mixing liquid and/or solid components, comprising a rotatable vessel of cup-like form having a base, a central hub portion and an outer first peripheral wall spaced radially outwardly from the hub portion, said wall defining a pouring opening in its upper portion and a plurality of outlet openings disposed at its lower portion, said vessel rotatable about a central vertically disposed axis through the hub portion, an inner section and an outer section defined by a second peripheral wall between the hub portion and outer wall, said inner section divided into a plurality of chambers by vertically oriented equiangularly spaced partition walls, each of said inner chambers having a flow port communicating with chambers in the outer section.

* * * * *